(12) United States Patent
Reznik et al.

(10) Patent No.: US 8,767,588 B2
(45) Date of Patent: Jul. 1, 2014

(54) METHOD AND APPARATUS FOR IMPLEMENTING A BLANKET WIRELESS LOCAL AREA NETWORK CONTROL PLANE

(75) Inventors: Alexander Reznik, Titusville, NJ (US); Chunxuan Ye, Wayne, PA (US); Samian Kaur, Conshohocken, PA (US); John L. Tomici, Southold, NY (US); Yuying Dai, Lachine (CA); Mathilde Benveniste, South Orange, NJ (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 798 days.

(21) Appl. No.: 12/880,388

(22) Filed: Sep. 13, 2010

(65) Prior Publication Data
US 2011/0188484 A1 Aug. 4, 2011

Related U.S. Application Data

(60) Provisional application No. 61/243,844, filed on Sep. 18, 2009, provisional application No. 61/310,399, filed on Mar. 4, 2010.

(51) Int. Cl.
*H04L 12/28* (2006.01)
(52) U.S. Cl.
USPC .......................................... 370/255; 370/346
(58) Field of Classification Search
USPC ............ 370/346, 449–457, 254–257, 395.31, 370/395.32, 331
See application file for complete search history.

(56) References Cited

U.S. PATENT DOCUMENTS

| | | | | |
|---|---|---|---|---|
| 5,812,531 | A * | 9/1998 | Cheung et al. | 370/255 |
| 6,650,639 | B2 * | 11/2003 | Doherty et al. | 370/395.31 |
| 7,522,540 | B1 * | 4/2009 | Maufer | 370/254 |
| 8,218,502 | B1 * | 7/2012 | Liu et al. | 370/331 |
| 2003/0129984 | A1 | 7/2003 | Dent | |
| 2005/0117524 | A1 * | 6/2005 | Lee et al. | 370/254 |
| 2005/0265259 | A1 * | 12/2005 | Thubert et al. | 370/255 |
| 2006/0133342 | A1 * | 6/2006 | Zeng | 370/346 |
| 2006/0268756 | A1 * | 11/2006 | Wang et al. | 370/310 |
| 2007/0015514 | A1 | 1/2007 | Bishop | |
| 2007/0086359 | A1 * | 4/2007 | Yaqub | 370/254 |
| 2009/0232021 | A1 * | 9/2009 | Bachmutsky | 370/254 |

OTHER PUBLICATIONS

Barry, et al., "Distributed Control Algorithms for Service Differentiation in Wireless Packet Networks," Proc. IEEE InfoCom, pp. 582-590, 2001.

(Continued)

*Primary Examiner* — Jeffrey M Rutkowski
(74) *Attorney, Agent, or Firm* — Volpe and Koenig, P.C.

(57) ABSTRACT

A method and apparatus for maintaining a connection between a wireless transmit/receive unit (WTRU) and a blanket wireless local area network (BWLAN) are described. An inter-working function (IWF) entity in a given network access point (NAP) of the BWLAN maintains lists of WTRUs in respective states. Furthermore, the given NAP maintains a list of neighbor NAPs, and operates in accordance with a selected WTRU mobility protocol. The states may include a "not aware" (NA) state in which the given NAP is actually not aware of a particular WTRU, an "active transmit" (AT) state in which the given NAP is actively transmitting to a particular WTRU, and a "neighbor range" (NR) state for WTRUs indicated in an update report from neighbor (URN) message that the given NAP was not aware of. The WTRU mobility protocol may be a push mobility protocol or a poll mobility protocol.

18 Claims, 14 Drawing Sheets

(56) References Cited

OTHER PUBLICATIONS

Extricom, "Enterprise Wireless LAN and the Broadband Myth: The Challenge of 802.11 WLAN Coverage and Capacity," May 2006. Available at www.extricom.com.

Foundry Networks, "MicroCell Deployments: Making a Bad Problem Worse for Pervasive Wireless LAN Deployments," Nov. 2006.

Institute of Electrical and Electronics Engineers, "IEEE Standard for Local and Metropolitan Area Networks, Virtual Bridged Local Area Networks," IEEE Std 802.1Q-2005, IEEE New York, NY, 2006.

Institute of Electrical and Electronics Engineers, "IEEE Standard for Local and Metropolitan Area Networks, Wireless LAN Medium Access Control (MAC) and Physical Layer (PHY) Specifications," IEEE Std 802.11-2007, IEEE New York, NY, 2007.

Maltsev, et al., "Channel Modes for 60 GHz WLAN Systems," IEEE 802.11-09/0334r6, Jan. 2010.

Meru Networks, "From Centralization available to Virtualization: The Evolution of at Wireless Infrastructure," 2009, www.merunetworks.com.

Rajagopal, et al., "Samsung, Intel, ETRI and CSUS Merged Proposal Text," Wireless Personal Area Networks, IEEE P802.15 Working Group for Wireless Personal Area Networks, (WPANs), IEEE P802.15-09-0786-01-0007, Nov. 2009.

Song, et al., "Enhancement of IEEE 802.11 Distributed Coordination Function With Exponential Increase Exponential Decrease Backoff Algorithm," Proc. Veh. Tech. Conf., 2003.

Venkatesan, et al., "Network MIMO: Overcoming Intercell Interference in Indoor Wireless Systems," Proc. $41^{st}$ Asilomar Conf. on Signals, Systems and Computers, pp. 83-87, 2007.

Wu, et al., "IEEE 802.11 Distributed Coordinated Function (DCF): Analysis and Enhancement," Proc. International Conference Communications, pp. 605-609, 2002.

Meru Networks, "From Centralization to Virtualization: The Evolution of Wireless Infrastructure," 2009, available at www.merunetworks.com.

\* cited by examiner

METHOD AND APPARATUS FOR IMPLEMENTING A BLANKET WIRELESS LOCAL AREA NETWORK CONTROL PLANE

CROSS REFERENCE TO RELATED APPLICATIONS

This application claims the benefit of U.S. Provisional Application No. 61/243,844 filed Sep. 18, 2009, and U.S. Provisional Application No. 61/310,399 filed Mar. 4, 2010, which are incorporated by reference as if fully set forth.

TECHNICAL FIELD

This application is related to wireless communications.

BACKGROUND

A blanket wireless local area network (BWLAN) may be viewed as an evolution of the virtual local area network (LAN) concepts developed in the industry and aimed at addressing higher-end enterprise wireless LAN deployments. In both the "virtual cell" and "virtual port", the stations are not aware of the specific access points (APs) that they are communicating with, since these APs appear as a single homogeneous network. Furthermore, as a consequence of network transparency, a wireless transmit/receive unit (WTRU) is also unaware of its own mobility throughout the network. Service transitioning between different APs is handled entirely within the network, the station is not aware that this has occurred.

Unlike many existing WLANs, the BWLAN has the ability to create effective sub-networks that are physically separated from each other in order to serve a single WTRU or a set of WTRUs. The BWLAN addresses the needs of networks requiring dense deployment of wireless network access points (NAPs) for applications such as high-reliability local area networks (LANs), (e.g., medical-grade LANs), home networks and urban wireless Internet access networks.

Support of dynamic network cellularization and mobility within such a BWLAN network presents a challenge. Furthermore, maintaining cell-clusters in the presence of WTRU mobility in a BWLAN has further complicated the matter.

A method and apparatus is desired for addressing these problems by providing a low-complexity implementation of cluster formation, maintenance and support of node mobility.

SUMMARY

A method and apparatus are described for maintaining a connection between a wireless transmit/receive unit (WTRU) and a blanket wireless local area network (BWLAN). An inter-working function (IWF) entity in a given network access point (NAP) of the BWLAN maintains lists of WTRUs in respective states. Furthermore, the given NAP maintains a list of neighbor NAPs, and operates in accordance with a selected WTRU mobility protocol. The states may include a "not aware" (NA) state in which the given NAP is actually not aware of a particular WTRU, an "active transmit" (AT) state in which the given NAP is actively transmitting to a particular WTRU, and a "neighbor range" (NR) state for WTRUs indicated in an update report from neighbor (URN) message that the given NAP was not aware of. The WTRU mobility protocol may be a push mobility protocol or a poll mobility protocol.

BRIEF DESCRIPTION OF THE DRAWINGS

A more detailed understanding may be had from the following description, given by way of example in conjunction with the accompanying drawings wherein.

DETAILED DESCRIPTION

Figure 1:
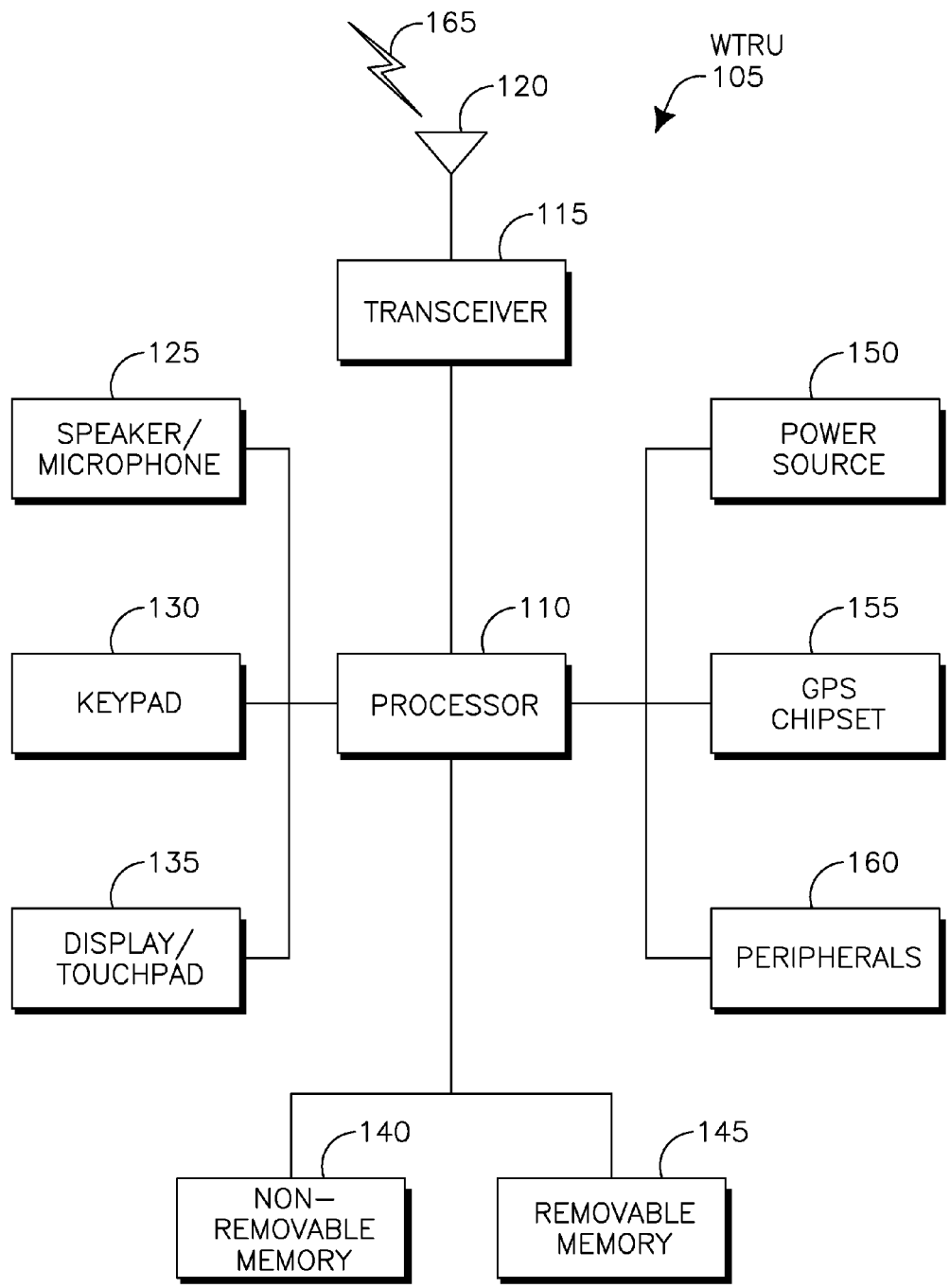
FIG. 1 is a system diagram of an example wireless transmit/receive unit (WTRU)

FIG. 1 is a diagram of an example WTRU 105. As shown in FIG. 1, the WTRU 105 may include a processor 110, a transceiver 115, a transmit/receive element 120, a speaker/microphone 125, a keypad 130, a display/touchpad 135, a non-removable memory 140, a removable memory 145, a power source 150, a global positioning system (GPS) chipset 155, and other peripherals 160. It will be appreciated that the WTRU 105 may include any sub-combination of the foregoing elements while remaining consistent with an embodiment.

The processor 110 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 110 may perform signal coding, data processing, power control, input/output processing, and/or any other functionality that enables the WTRU 102 to operate in a wireless environment. The processor 110 may be coupled to the transceiver 115, which may be coupled to the transmit/receive element 120. While FIG. 1 depicts the processor 110 and the transceiver 115 as separate components, it will be appreciated that the processor 110 and the transceiver 115 may be integrated together in an electronic package or chip.

The transmit/receive element 120 may be configured to transmit signals to, or receive signals from, a base station over an air interface 165. For example, in one embodiment, the transmit/receive element 120 may be an antenna configured to transmit and/or receive radio frequency (RF) signals. In another embodiment, the transmit/receive element 120 may be an emitter/detector configured to transmit and/or receive infrared (IR), ultraviolet (UV), or visible light signals, for example. In yet another embodiment, the transmit/receive element 120 may be configured to transmit and receive both RF and light signals. It will be appreciated that the transmit/receive element 120 may be configured to transmit and/or receive any combination of wireless signals.

In addition, although the transmit/receive element 120 is depicted in FIG. 1 as a single element, the WTRU 105 may include any number of transmit/receive elements 120. More specifically, the WTRU 102 may employ multiple-input multiple-output (MIMO) technology. Thus, in one embodiment, the WTRU 105 may include two or more transmit/receive elements 120 (e.g., multiple antennas) for transmitting and receiving wireless signals over the air interface 165.

The transceiver 115 may be configured to modulate the signals that are to be transmitted by the transmit/receive element 120 and to demodulate the signals that are received by the transmit/receive element 120. As noted above, the WTRU 105 may have multi-mode capabilities. Thus, the transceiver 115 may include multiple transceivers 115 for enabling the WTRU 105 to communicate via multiple radio access technologies (RATs), such as universal terrestrial radio access (UTRA) and IEEE 802.11, for example.

The processor 110 of the WTRU 105 may be coupled to, and may receive user input data from, the speaker/microphone 125, the keypad 130, and/or the display/touchpad 135 (e.g., a liquid crystal display (LCD) display unit or organic light-emitting diode (OLED) display unit). The processor 110 may also output user data to the speaker/microphone 125, the keypad 130, and/or the display/touchpad 135. In addition, the processor 110 may access information from, and store data in, any type of suitable memory, such as the non-removable memory 140 and/or the removable memory 145. The non-removable memory 140 may include random-access memory (RAM), read-only memory (ROM), a hard disk, or any other type of memory storage device. The removable memory 145 may include a subscriber identity module (SIM) card, a memory stick, a secure digital (SD) memory card, and the like. In other embodiments, the processor 110 may access information from, and store data in, memory that is not physically located on the WTRU 105, such as on a server or a home computer (not shown).

The processor 110 may receive power from the power source 150, and may be configured to distribute and/or control the power to the other components in the WTRU 105. The power source 150 may be any suitable device for powering the WTRU 105. For example, the power source 150 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 110 may also be coupled to the GPS chipset 155, which may be configured to provide location information (e.g., longitude and latitude) regarding the current location of the WTRU 105. In addition to, or in lieu of, the information from the GPS chipset 155, the WTRU 105 may receive location information over the air interface 165 from a base station and/or determine its location based on the timing of the signals being received from two or more nearby base stations. It will be appreciated that the WTRU 105 may acquire location information by way of any suitable location-determination method while remaining consistent with an embodiment.

The processor 110 may further be coupled to other peripherals 160, which may include one or more software and/or hardware modules that provide additional features, functionality and/or wired or wireless connectivity. For example, the peripherals 160 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 2:
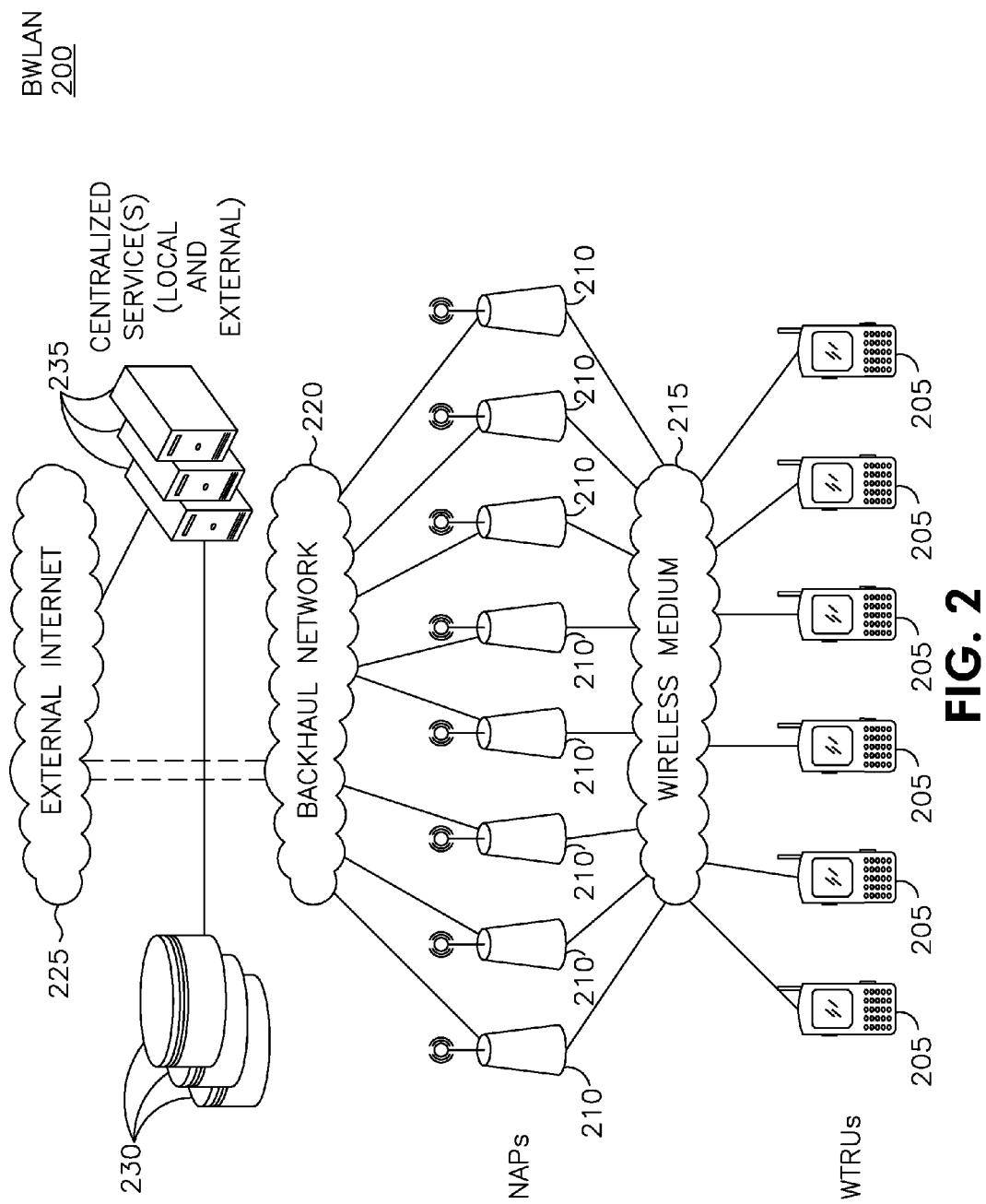
FIG. 2 shows a canonical BWLAN structure used with WTRUs similar to the WTRU of FIG. 1.

FIG. 2 shows a structure of a canonical BWLAN 200. The BWLAN 200 includes of a number of WTRUs 205, (i.e., end nodes (ENs)), which communicate with a plurality of NAPs 210 through the wireless medium 215. The NAPs 210 are interconnected through a backhaul network 220, which is likely to be wired, but may be wireless or may be comprised of a mixture of different nodes. For example, the backhaul network 220 may utilize power-line communication or optical wireless communication, or the wireless medium 215 itself, with some of the NAPs 210 acting as wireless relays, or the like. The BWLAN 200 may further comprise an external Internet network 225, which communicates with the backhaul network 220. The BWLAN 200 may also comprise one or more local databases 230 and one or more centralized servers 235, which provide centralized services (local and external).

New network functions, procedures, and protocols are described to establish and maintain cellularization with respect to the WTRUs in the network, and to effectively handle mobility of WTRUs, even though they may appear to be moving slowly relative to traditional WLAN and cellular networks. Furthermore, the coordination and cooperation of the NAPs may be effectively handled, while keeping WTRUs unaware.

The BWLAN 200 may be configured for single channel operation, whereby all of the NAPs 210 may operate on the same frequency channel. This does not preclude operation on multiple channels. Such operation may be treated as multiple BWLANs separated in frequency.

Given the large number of NAPs 210 present in the BWLAN 200, it is not convenient to have the WTRUs 205 associate with these NAPs 210, since these associations may require frequent network management operations. Rather, the BWLAN 200 appears to each WTRU 205 as a single virtual network entity. Each WTRU 205 may be associated with a set of NAPs 210 that communicate with the WTRU 205. This set of NAPs 210 may create a virtual network dedicated to servicing the given WTRU 205, and is referred to as the "blanket" of the WTRU 205.

Figure 3:
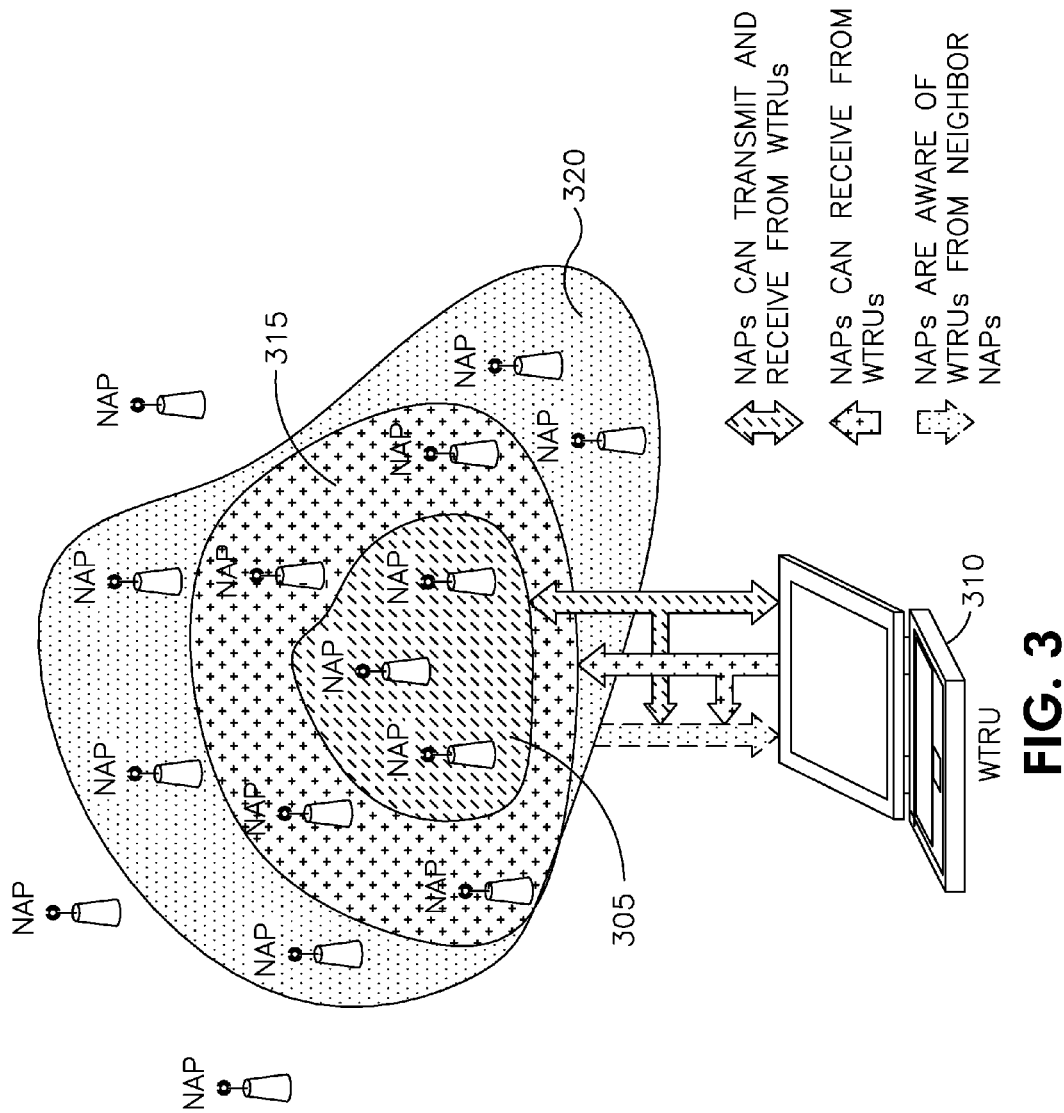
FIG. 3 shows multi-layer blanket view.

FIG. 3 distinguishes between three sets of NAPs. These sets include a first set 305 of NAPs in active communication with a WTRU 310, which corresponds to the definition of a blanket, a second set 315 of NAPs, which are able to hear (i.e., receive) from the WTRU 310 but do not actively transmit to it, and a third set 320 of NAPs which are aware of the presence of the WTRU 310, but are not able to receive from it.

The BWLAN may also be configured for dynamic network separation. The notion of a blanket allows the BWLAN to locate each WTRU within itself and transmit to the WTRUs only from the NAPs that can reach it. This, combined with the likely effect of low-power transmission by the WTRU, reduces overall contention for the wireless medium, as well as permits spatial re-use within the network. Thus, multiple devices may transmit on the same channel at the same time without a collision, if they are far enough away from each other.

The BWLAN shares characteristics of virtual wireless LANs. However, while such existing LANs aggregate the medium access control (MAC) of multiple access points (APs) into a single centralized server, the BWLAN decentralizes as many operations as possible, emphasizing efficiency, use of limited bandwidth and high-delay backhauls and scalability.

In the BWLAN architecture described herein, one or more NAPs form a virtual cell which dynamically follows the WTRU, adding and removing NAPs as needed to maintain services to the WTRU, or WTRU set, based on quality of service (QoS) requirements and mobility within the BWLAN. From a WTRU perspective, the virtual cell provides continuous (i.e., WLAN blanket) coverage for the WTRU throughout the BWLAN.

A blanket is referred to as a set of NAPs and a gateway, all of which serve a single WTRU or a set of WTRUs that is part of the same service set and need to form a highly efficient and localized private virtual network. A WLAN blanket is the innermost set 305 of NAPs of the three layers shown in FIG. 3, whereby the set 305 of NAPs actively transmit to the WTRU 310.

Figure 4:
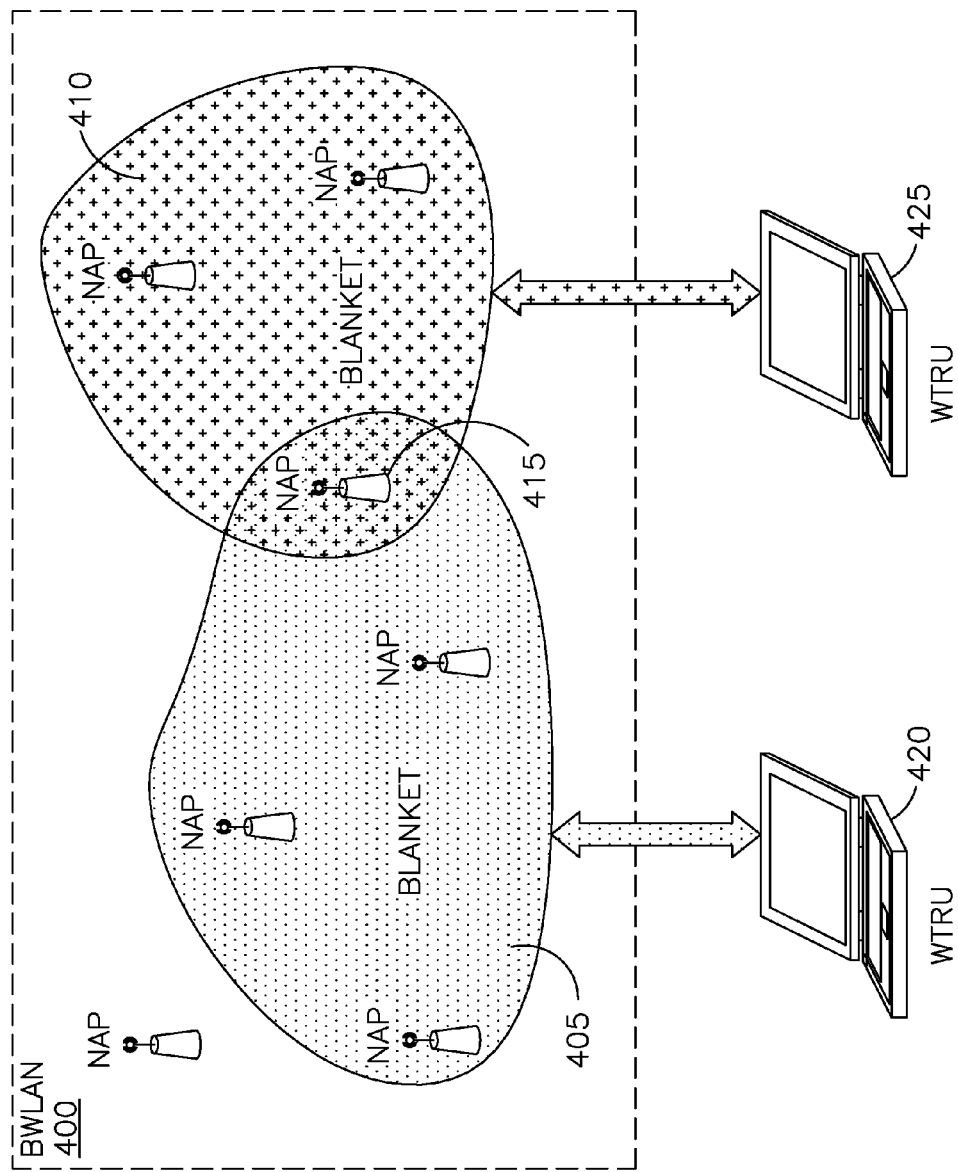
FIG. 4 shows BWLAN and blanket definitions

FIG. 4 shows a BWLAN 400 including blankets 405 and 410 that may have a common NAP 415 and communicate with respective WTRUs 420 and 425. The BWLAN 400 implements short-range communications between the WTRUs 420 and 425, and a plurality of NAPs (e.g., via low power transmission or limited-propagation spectrum such as 60 GHz and optical wavelengths). Both centralized and distributed architectures are addressed. Various centralized services may be considered mandatory for full BWLAN deployment, (e.g., authentication, authorization, and accounting (AAA) server for security and mobility anchor for mobility).

The protocol architecture of the BWLAN 400 may address two main protocol stacks: wireless network protocols between the WTRUs 420 and 425, and the BWLAN 400, and backhaul network protocols within the BWLAN 400 (i.e., between NAPs and other infrastructure elements such as database servers, switches, routers, gateways, centralized controllers, or the like).

Figure 5:
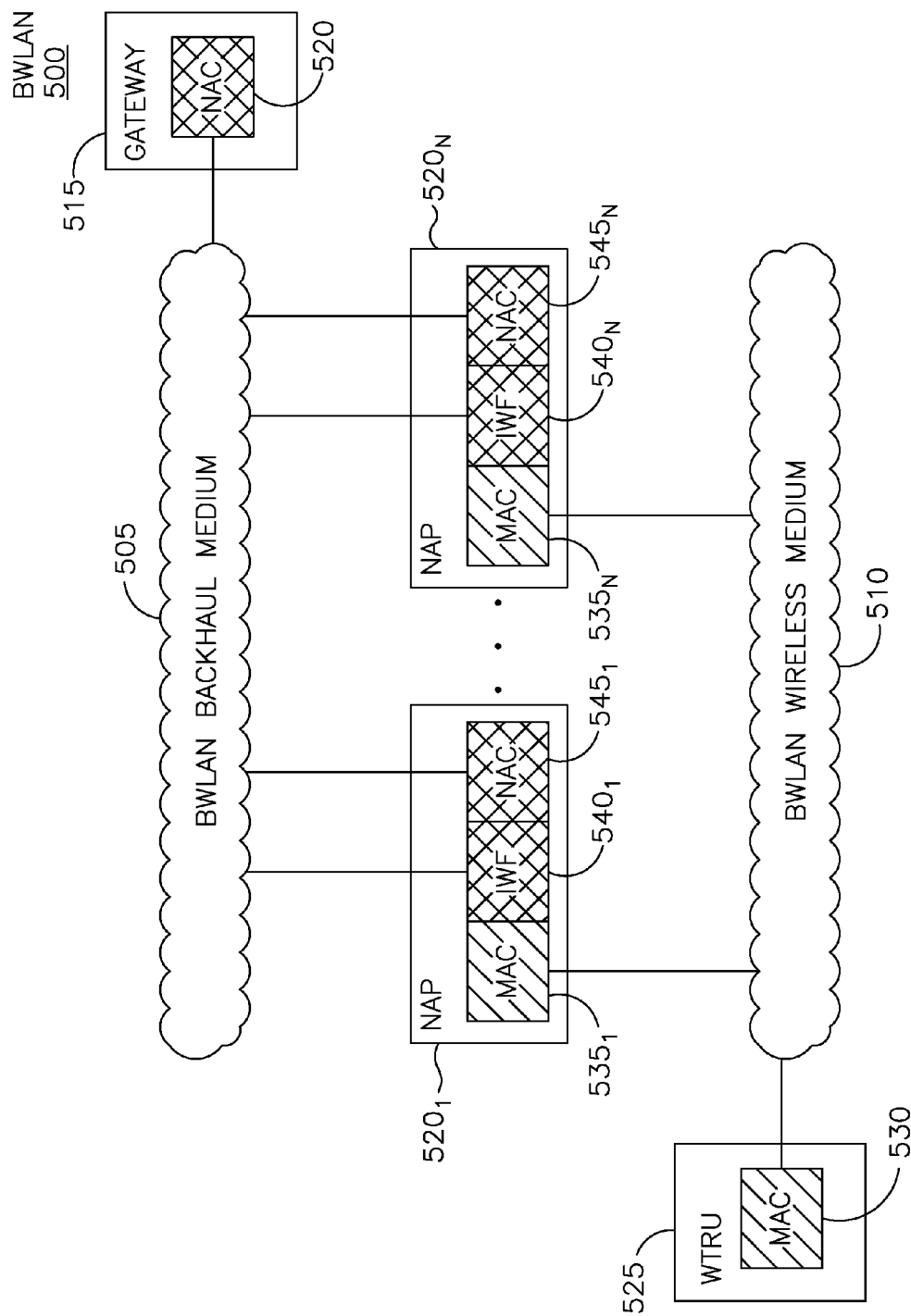
FIG. 5 shows high level architecture for BWLAN.

FIG. 5 shows the high level protocol architecture for a BWLAN 500 including a BWLAN backhaul medium 505, a BWLAN wireless medium 510, a gateway 515 including a network access control (NAC) entity 520, a plurality of NAPs $520_1 \ldots 520_N$, and a WTRU 525 including a MAC entity 530. Each of the NAPs 520 include a MAC 535, an inter-working function (IWF) entity 540 and a NAC entity 545. A WTRU-NAP access link is implemented in a MAC associated with the BWLAN wireless medium 510 applicable to the specific BWLAN implementation. The BWLAN wireless medium 510 may include one or more technologies including radio frequency (RF), optical, or the like. The access protocol at the NAPs 520 is controlled by the IWF entities 540. Various options for media access for control signal and data transmissions are presented below.

In the control plane, an IEEE 802.11 based MAC architecture may be utilized, which may be expanded in a backward compatible manner in order to support additional functions for BWLAN support. Inter-NAP communication is assumed to occur primarily on a logically separate transport medium than the WTRU-NAP communication medium. The inter-NAP access protocols are implemented in the NAC entity 545 within the NAPs 520. Peer NAC protocol entities may also exist in other BWLAN backhaul medium elements including database servers, switch, router, gateway functions, and centralized controllers.

Gateway-NAP access protocols are implemented in the BWLAN backhaul medium 505. The gateway-NAP access protocols are implemented in the IWF entities 540 at the NAPs 520, and the NAC entity 520 at the gateway 515.

The backhaul latency may be high so that real-time control and coordination of individual NAP transmissions is not possible. The latency of general backhaul communication may be higher than the latency of communication in a neighborhood of NAPs. This assumption reflects the topologies of certain backhaul architectures such as power-line networks and hierarchical LANs, with individual routers supporting a neighborhood, and which are interconnected to create the complete backhaul.

It is desirable to maintain the WTRU to be backward compatible to a station (STA). As much as possible, the design may make no assumptions about the specific physical (PHY) media (e.g., RF, visible light source (VLS), UV) and capability (e.g., multiple-input multiple-output (MIMO)).

Figure 6:
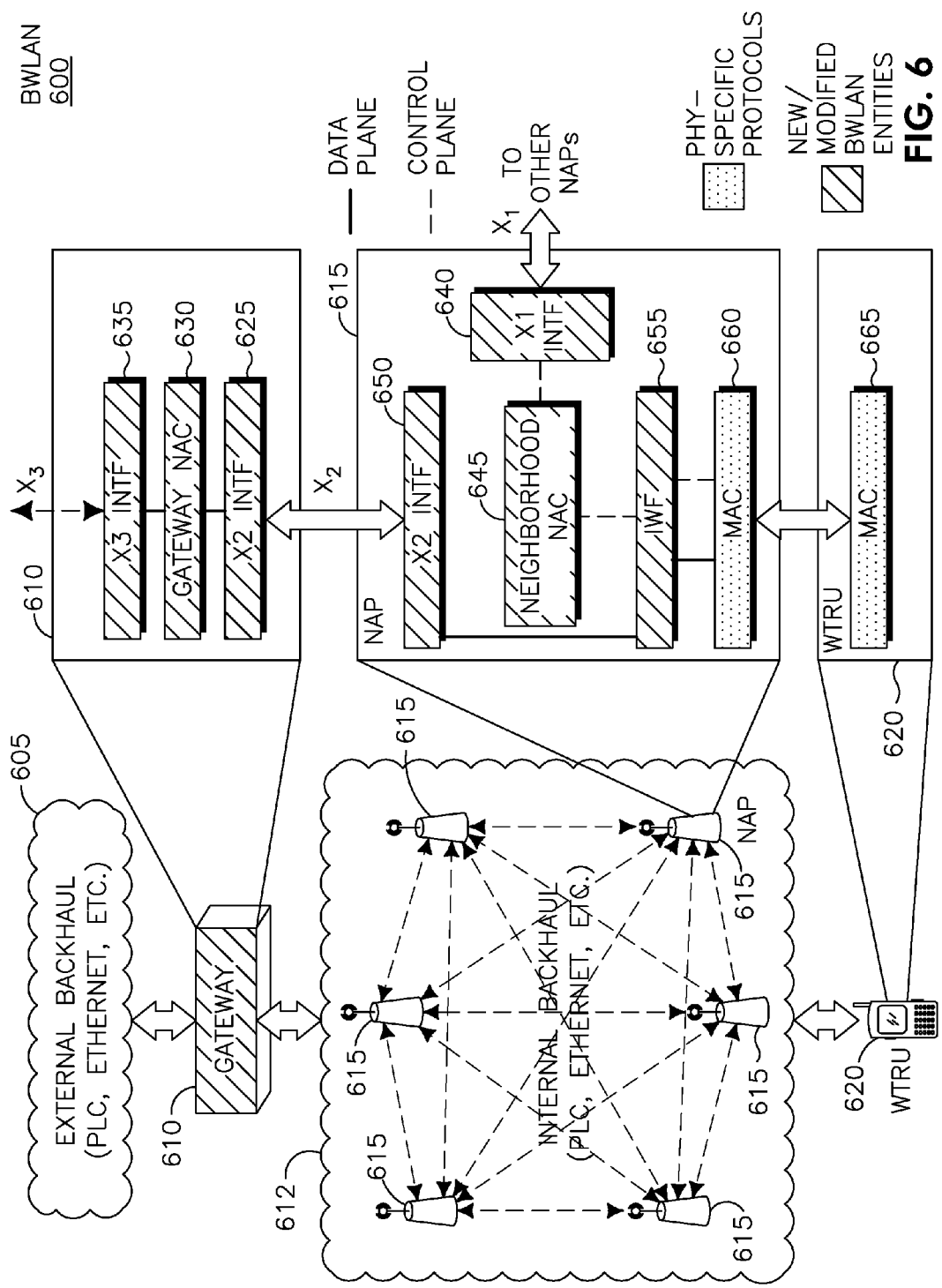
FIG. 6 shows functional partitioning of the BWLAN centralized mode.
Figure 7:
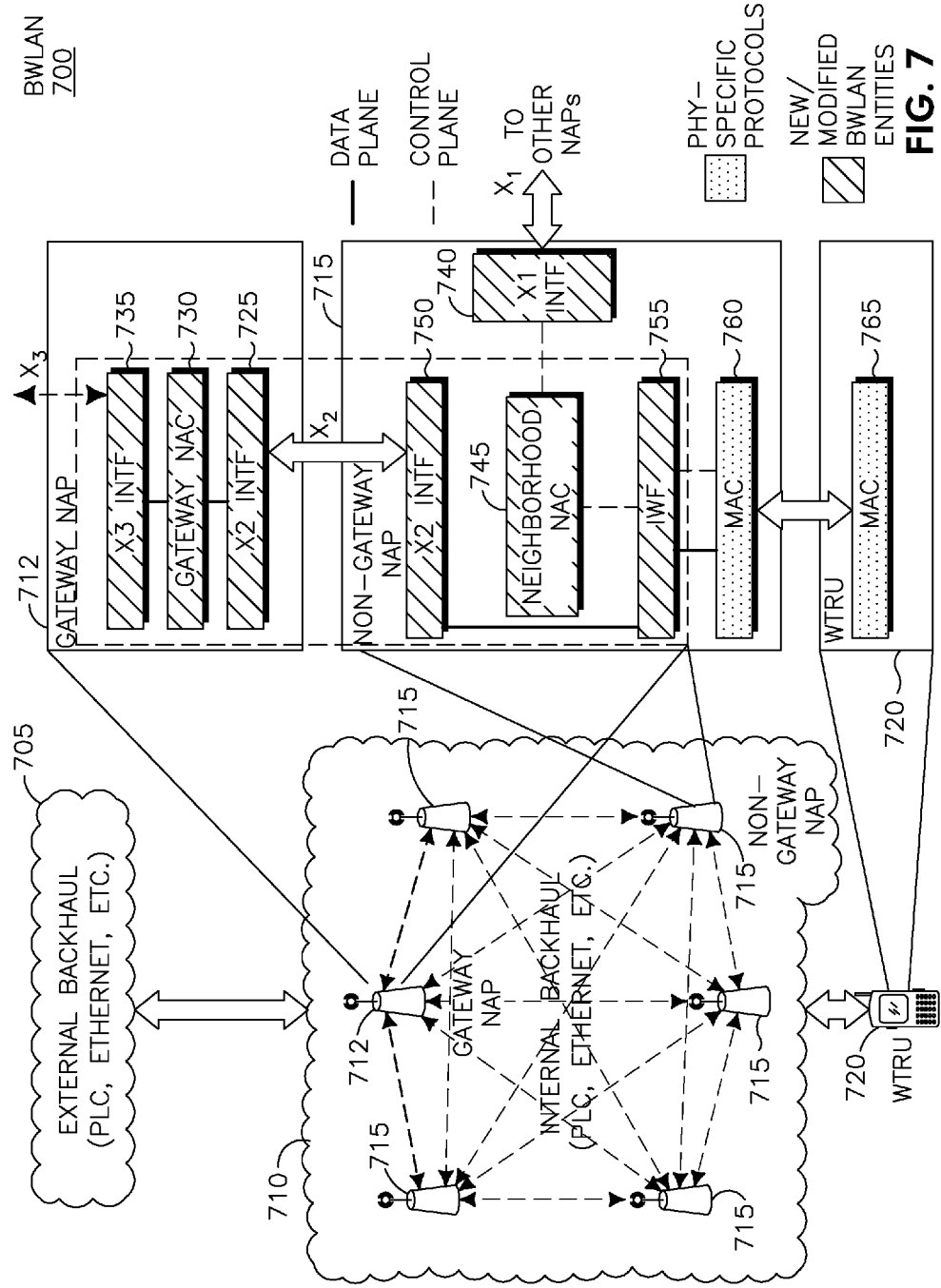
FIG. 7 shows functional partitioning of the BWLAN distributed mode.

FIG. 6 shows functional partitioning of the BWLAN centralized mode, whereas FIG. 7 shows functional partitioning of the BWLAN distributed mode. The difference between the centralized mode and the distributed mode is that in the distributed mode, one of the NAPs may assume the role of the gateway.

As shown in FIG. 6, a BWLAN 600 comprises an external backhaul network 605, a gateway 610, internal backhaul network 612 comprising a plurality of NAPs 615, and a WTRU 620. The gateway 610 may include an X2 interface 625, a gateway NAC entity 630, and an X3 interface 635. The NAPs 615 may each comprise an X1 interface 640, a neighborhood NAC function 645, an X2 interface 650, an IWF entity 655 and a MAC entity 660. The WTRU 620 may include an IEEE 802.11 MAC entity 665.

As shown in FIG. 7, a BWLAN 700 comprises an external backhaul network 705, an internal backhaul network 710 comprising a gateway NAP 712 and a plurality of non-gateway NAPs 675, and a WTRU 720. The gateway NAP 712 may include an X2 interface 725, a gateway NAC entity 730, and an X3 interface 735. The non-gateway NAPs 715 may each comprise an X1 interface 740, a neighborhood NAC entity 745, an X2 interface 750, an IWF entity 755 and a MAC entity 760. The WTRU 720 may include a, IEEE 802.11 MAC entity 765.

In the NAPs 615 and 715 shown in FIGS. 6 and 7, the MAC entities 660 and 760 may interface with the IWF entities 655 and 755. The IWF entities 655 and 755 allow the respective MAC entities 660 and 760 to hide BWLAN-specific details from the WTRUs 620 and 720 (e.g., use of a virtual cell identity (ID)/MAC address as provided by the NAC entities 645 and 745). The IWF entities 655 and 755 also provide the capability to extract relevant information from received MAC frames for potential use by the decision making functions in the NAC entities 645 and 745. MAC data frames may typically pass through the IWF entities 655 and 755 transparently to the higher layer entities, including the gateway 610 or gateway NAP 712. The interface between the NAPs 615 and 715, and the gateways 610 and 712, is referred to as the X2 interface 650, 625, 750, 725.

The IWF entities 655 and 755 may maintain a list of WTRUs served by the NAPs 615 and 715, and their corresponding blanket virtual (or gateway) MAC address.

The BWLAN NAC functions may be further expanded into neighborhood and gateway functional entities. Each NAP 615 and 715 may contain a neighborhood NAC entity 645 and 745, which maintains a list of its neighbor NAPs and how to reach them. The neighborhood NAC entities 645 and 745 may implement a local NAP function that interfaces with the IWF entities 655 and 755, and the MAC entities 660 and 760, and support a distributed control plane protocol with other NAPs via the X1 (i.e., backhaul) interfaces 640 and 740. The neighborhood NAC entities 645 and 745 may be topology-specific and adapt to the restrictions and take advantage of opportunities offered by each specific X1 (i.e., backhaul) network.

Each WTRU has an associated gateway node that maintains a forwarding table to track the set of NAPs that are aware of the WTRU. In other words, the gateway NAC maintains global information about the BWLAN. The gateway relays information between the set of NAPs communicating with the WTRU and the core network, through the X3 interface.

The gateway node may be a centralized external entity, (i.e., gateway 610), as shown in FIG. 6, or one of the NAPs may assume the role of the gateway, (i.e., gateway NAP 712), as shown in FIG. 7. The gateway node acts as an anchor for forwarding data frames to/from the appropriate NAPs servicing specific WTRUs.

The functional requirements associated with the control plane functionality of the BWLAN may include all functions required to configure and maintain a WTRU-BWLAN connection, control, and manage NAP operation and control of blankets. Operational scenarios and demonstration of how the scenarios are enabled using the functionality will now be defined, including the functionality and procedures in the NAP and the gateway.

The following functions may need to be supported by the control plane of the BWLAN:

1) WTRU admission control, including discovery, association/de-association, session establishment, including authentication and security association; cellularization of the BWLAN, including blanket formation, blanket management in response to WTRU mobility; and 2) blanket management in response to BWLAN topology constraints, such as NAP loading and backhaul topology.

Figure 8:
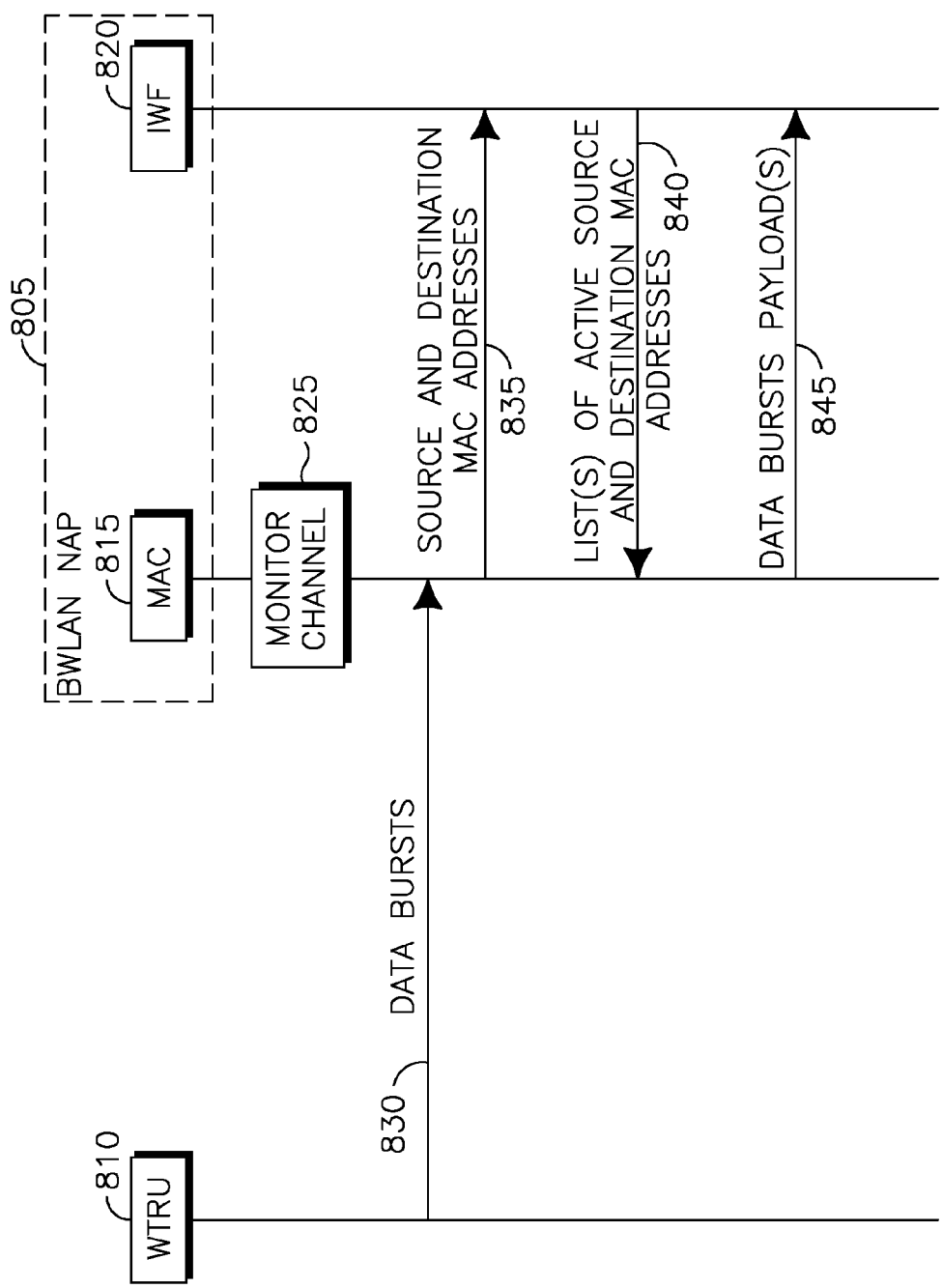
FIG. 8 is a signal flow diagram that shows a BWLAN NAP operating according to a set of constraints.

To support these functions, a BWLAN NAP 805 operates according to a set of constraints, as shown in the signal flow diagram of FIG. 8. The BWLAN NAP 805 communicates with at least one WTRU 810, and includes a MAC entity 815 and an IWF entity 820. The BWLAN NAP 805 monitors a channel 825 at all times and receives a plurality of data bursts 830 from the WTRU 810. The MAC 815 in the BWLAN NAP 805 extracts source and destination MAC addresses 835 from all of the received WTRU frame bursts 830 and forwards them to the IWF entity 820 in the BWLAN NAP 805. The MAC addresses 835 are also extracted from successfully acknowledged downlink transmissions in situations such as IEEE 802.11, where acknowledgements do not contain the source address. The IWF entity 820 may provide the MAC entity 815 with a list of active source and destination MAC addresses for both transmission and reception. The lists may be different. The MAC entity 815 may only process data bursts for transmission if the source (i.e., the BWLAN NAP 805) and the destination (i.e., the WTRU 810) MAC addresses are in an active transmission list. The MAC entity 815 may forward the payload of a received data burst 830 to the IWF 820 if the source (i.e., the BWLAN NAP 805) and destination (i.e., the WTRU 810) MAC addresses are in an active reception list.

A WTRU that is not associated with any blankets (i.e., APs from its perspective), generally relies on the WLAN association procedures to establish an initial connection. From the perspective of a WTRU, the WTRU selects one of a number of service set identifiers (SSIDs) being advertised and associated with an AP being advertised by the network. The association procedure proceeds on to authentication, or the like, as in the current WLANs.

The challenge that needs to be addressed here is how to advertise the SSID and the associated AP. Since every WTRU is, in principle, provided its own private network, and all APs that the WTRUs see are virtual, the problem may not be solved by having an NAP advertise its own MAC address, nor may the BWLAN advertise a single SSID for the LAN. In this case, two different approaches are possible.

Figure 9:
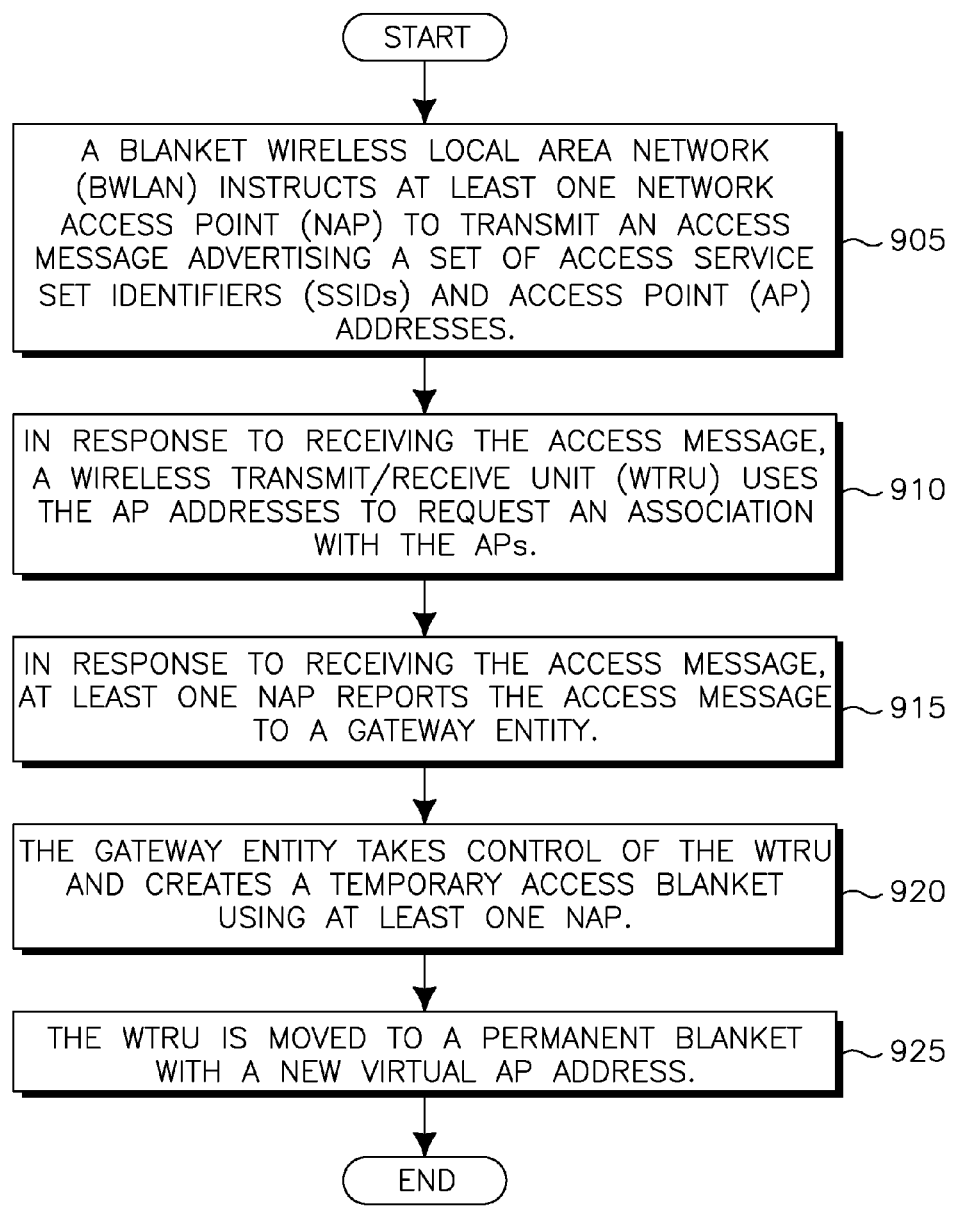
FIGS. 9 and 10 are flow diagrams of procedures for advertising an SSID and an associated AP.

FIG. 9 is a flow diagram of a procedure 900 for advertising an SSID and an associated AP. The network (i.e., a BWLAN) instructs at least one of a plurality of NAPs to transmit an access message (i.e., a beacon) advertising a set of access SSIDs, together with AP addresses (905). In response to receiving the access message, a WTRU uses the AP addresses to request an association with the APs (910). Any NAP that receives the access message, reports the access message over an X2 interface, either to the central gateway 610 of FIG. 6, or to one or a set of gateway NAPs 712, as shown in FIG. 7 (915). The gateway entity responds by taking control of the WTRU and creating a temporary access blanket, presumably using the NAPs which reported the WTRU access message, as determined by the gateway (920). The gateway entity facilitates the remaining operations, such as authentication, session establishment, or the like. Assuming that the association and other access procedures are successful, the WTRU is moved to a permanent blanket with a new virtual AP address (925).

The procedure 900 has a problem in that the last step is not explicitly supported by the IEEE 802.11 standard. While the AP switch may be implemented during the association response, this approach is neither prohibited nor explicitly supported by the existing standard. As such, it may be supported by some existing WTRUs, but not all.

Figure 10:
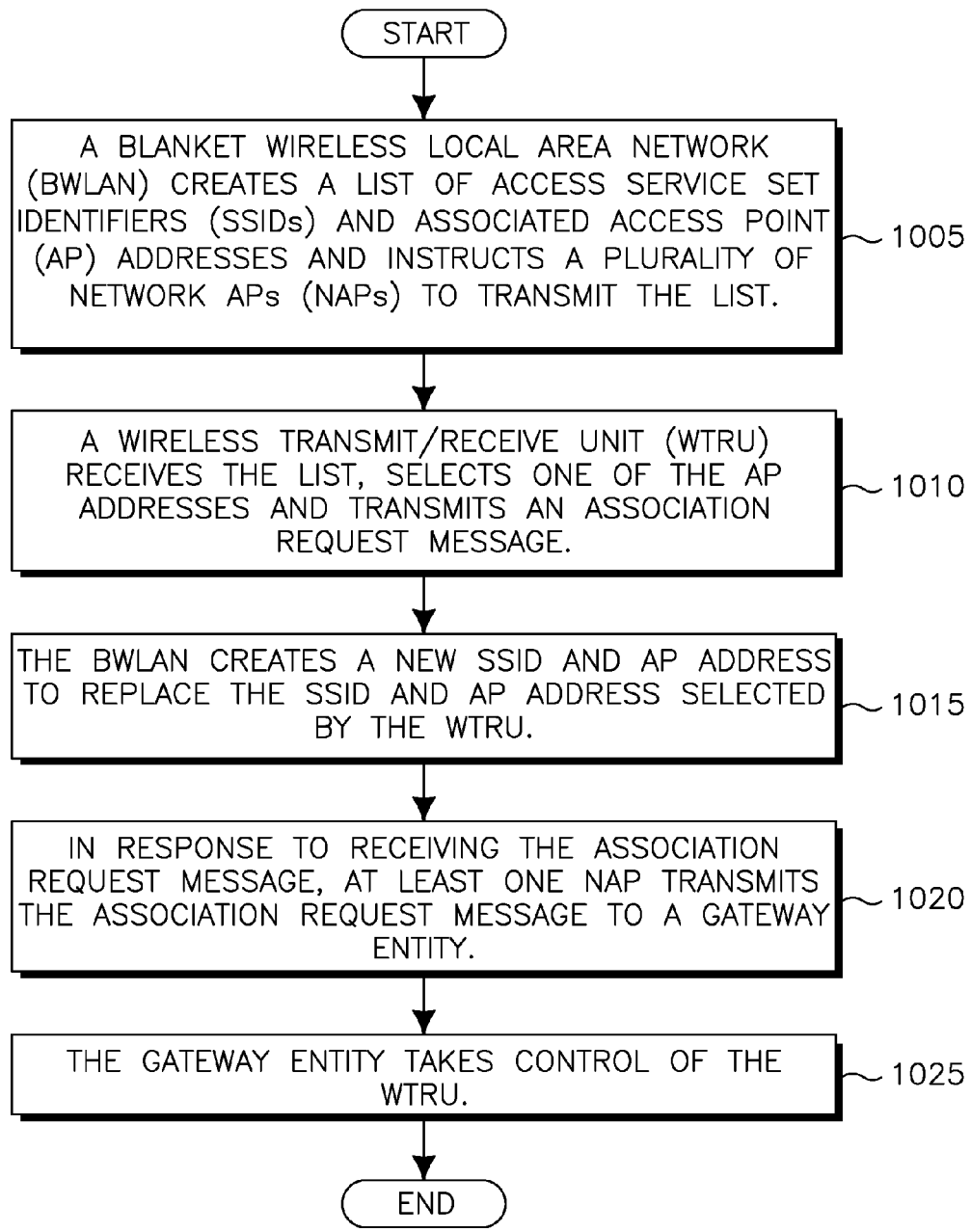

FIG. 10 is a flow diagram of an alternate procedure 1000 for advertising an SSID and an associated AP. The network (i.e., a BWLAN) creates a list of access SSIDs and associated AP addresses, and instructs a plurality of NAPs to transmit the list (1005). A WTRU that needs to access the network selects one of the AP addresses from the list and transmits an association request message (1010). Provided that the association is successful, this becomes the WTRU's blanket. The network creates a new open SSID and AP address to replace the one from the list that was used up (1015). Any NAP that receives an association request message, transmits it over an X2 interface to either the central gateway, as shown in FIG. 6 or to one or a set of gateway NAPs, as shown in FIG. 7 (1020). The SSID and AP address used are included in the message. One of the gateway entities responds by taking control of this WTRU and blanket (1025). If more than one WTRU attempts to associate to the same blanket, one of the WTRUs is selected and the rest are denied association. As this SSID may no longer be advertised, the WTRUs which were denied association may attempt a new association using a new SSID and AP address. The controlling gateway entity handles the rest of the access procedure.

Once a WTRU is associated with a blanket, or rather acts as if it is associated, it needs to be discovered by new NAPs as it moves through the BWLAN. A key challenge is to make this procedure transparent to the WTRU. Thus, association cannot be relied upon. Instead, the WTRU's transmission made for other reasons (e.g., data bursts) needs to be used by the NAP to determine whether or not it needs to support this WTRU.

Figure 11:
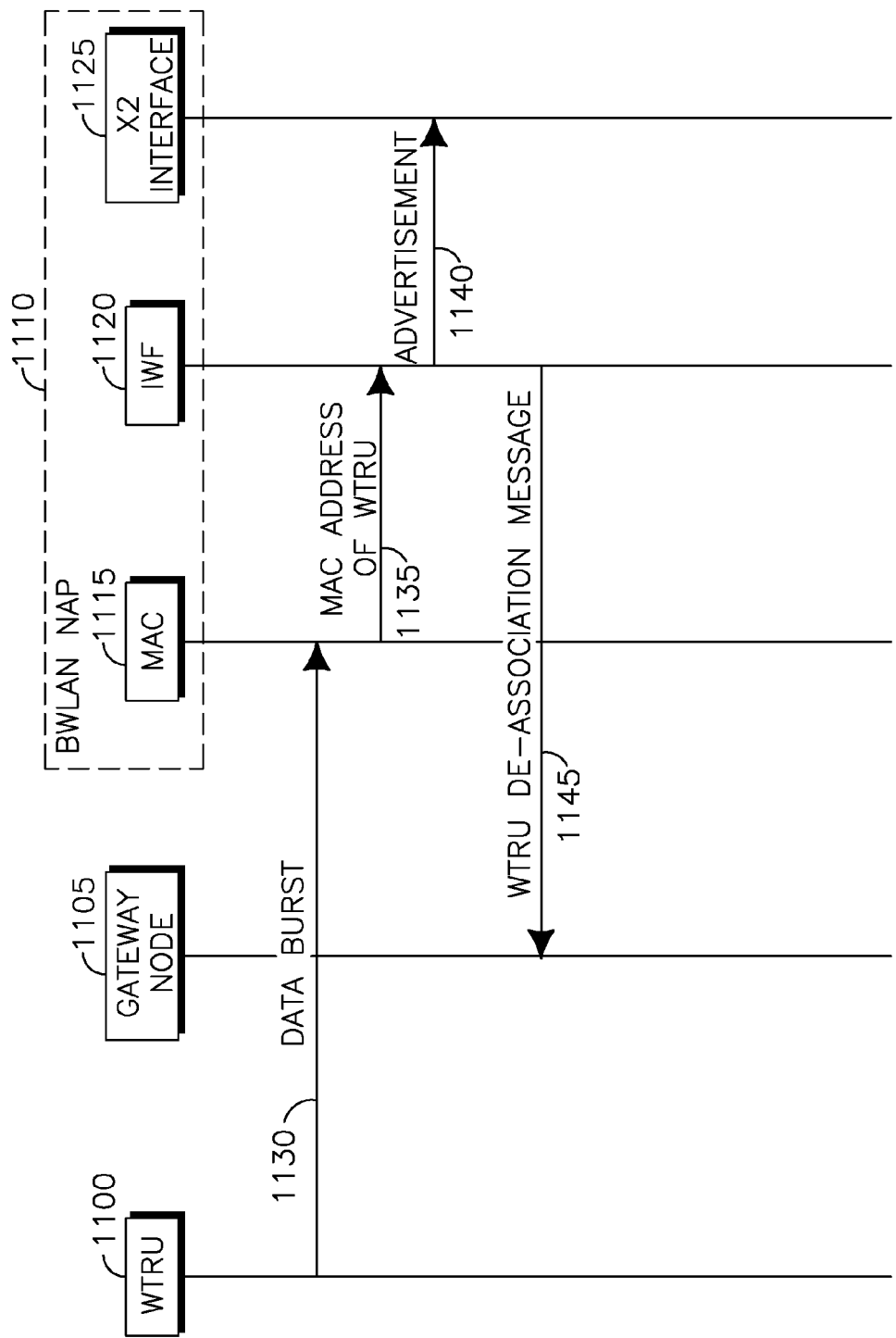
FIG. 11 is a signal flow diagram in a network including a WTRU, a BWLAN NAP and a gateway node.

FIG. 11 is a signal flow diagram between a WTRU 1100, a gateway node 1105 and a BWLAN NAP 1110 including a MAC entity 1115, an IWF entity 1120 and an X2 interface 1125. Upon receiving a data burst 1130 from a WTRU 1100 that is not in an active reception list, the MAC entity 1115 forwards a MAC address 1135 of the WTRU 1100 to the IWF entity 1120. The IWF entity 1120 compares the MAC address of the WTRU 1100 with several lists it may be maintaining, including neighbor lists. If the address appears on any of the lists, the IWF entity 1120 may act according to the procedures associated with each list. If the MAC address does not appear on any of the lists in the IWF entity 1120, then the IWF entity 1120 uses the X2 interface 1125 to send an advertisement message 1140 indicating the detection of the associated WTRU 1100 to the BWLAN 1110.

If the WTRU 1100 is associated, a gateway node 1145 of the WTRU 1100 may respond to the BWLAN NAP 1110 confirming the association and provide the BWLAN NAP 1110 with configuration information necessary to the communication with the WTRU 1100. Furthermore, the IWF entity 1120 of the BWLAN NAP 1110 may add the WTRU 1100 to one of its WTRU lists according to the mobility procedures outlines hereinafter. If no response to the association is received by the BWLAN NAP 1110 within a predetermined time period, then the BWLAN NAP 1110 may not communicate with the WTRU 1100. Depending on security procedures, the WTRU 1100 may be added to a security violation list within the IWF entity 1120.

When the BWLAN NAP 1110 stops supporting (i.e., de-associates with) the WTRU 1100, the IWF entity 1120 may report the event to the WTRU's gateway node 1105 using the X2 interface 1125. Once the gateway node 1145 has no more NAPs supporting the WTRU 1100, it may de-associate the WTRU 1100 from the BWLAN 1110, delete its blanket, and end all session and security associations for that WTRU 1100.

WTRU authentication, session and security association procedures are handled by the gateway node 1105, as well as entities beyond the realm of the BWLAN (e.g., a AAA server). These procedures are identical to those used by existing WLANs (e.g., 802.11 standards).

The WTRU mobility and cellularization function is one of the main control functions of the NAP. This function is responsible for the distributed maintenance of the WTRU blanket, support of WTRU mobility, and support of communication (i.e., data plane operation) between the WTRU and the BWLAN. The function is primarily located within the IWF entity and the neighborhood NAC entity, and relies on the X1 interface.

Figure 12:
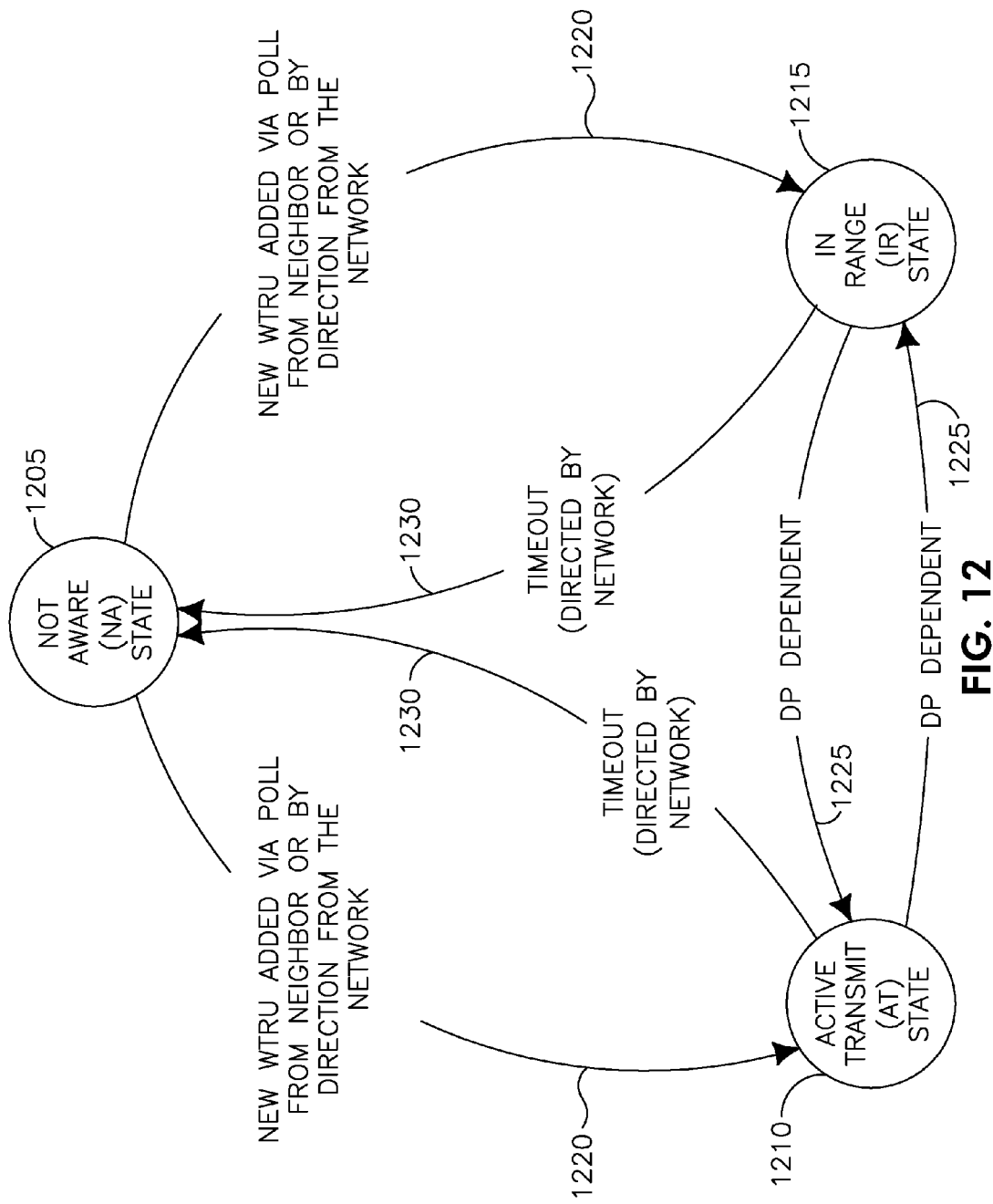
FIG. 12 shows a state transition diagram for a wireless transmit/receive unit (WTRU) within a network access point (NAP) under the qM mobility protocol.

FIG. 12 shows a state transition diagram for a WTRU within a NAP under the qM mobility protocol. As shown in FIG. 12, for each WTRU, the IWF entity within each NAP may associate several states including a "not aware" (NA) state 1205, an "active transmit" (AT) state 1210 and an "in range" (IR) state 1215. In the NA state 1205, the NAP is not aware of the WTRU. In the AT state 1210, the NAP is actively transmitting to the WTRU. In the IR state 1215, the NAP is aware of the WTRU but is not actively transmitting to it. Instead, the NAP may be receiving from the WTRU. The BWLAN may instruct a NAP to drop a WTRU from its active list and/or neighbor list. This may be performed for a variety of reasons. For example, sometimes it is beneficial to provide smaller non-overlapping blankets, instead of larger overlapping blankets. This may reduce interference and thus improve performance.

Such an operation needs to be centrally controlled (by the BWLAN), and may be enabled by instructing the NAPs at the boundaries of two blankets to stop communicating with the WTRU, (i.e., overriding the "default" protocol behavior). This results in a network-directed transition 1220 to the AT state 1210 and/or to the IR state 1215. Likewise, the network may force a NAP to transmit to the WTRU or add it to its neighbor list for its own network management reasons. Data protocol (DP) dependent messages 1225 may be exchanged between the AT state 1210 and the IR state 1215, whereby the time when a NAP stops just listening and starts transmitting depends on how a blanket DP is arranged.

Still referring to FIG. 12, a timeout 1230 may occurs when a WTRU is considered active by a NAP (either in the AT state 1210 or in the IR state 1215), and there must be some means for removing (i.e., disassociating) this WTRU from such list if the NAP has lost track of the WTRU, (e.g., a signal has not been received from the WTRU for a predefined time period).

Figure 13:
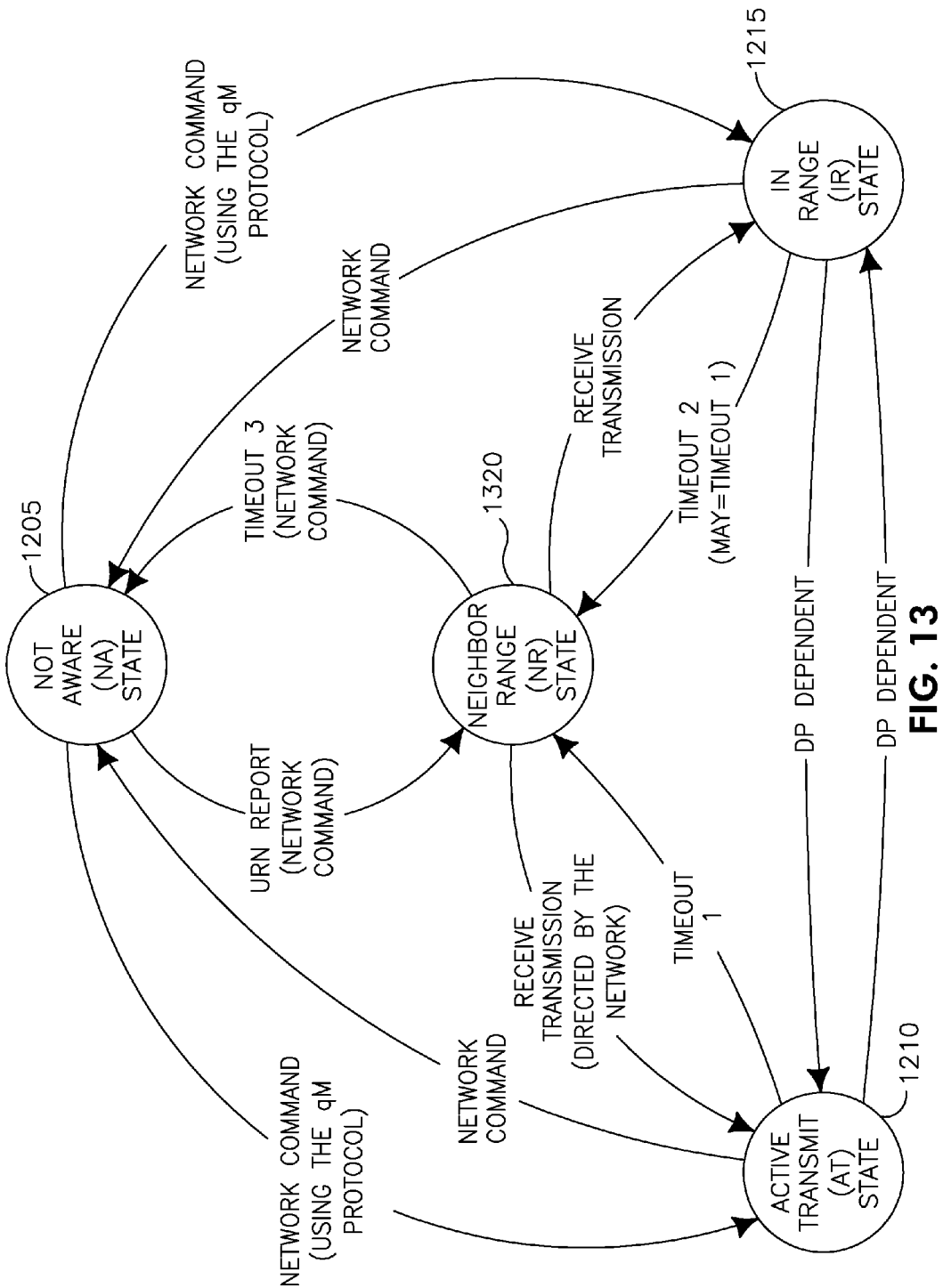
FIG. 13 shows a state transition diagram for a WTRU within a NAP under the pM mobility protocol.

FIG. 13 shows a state transition diagram for a WTRU within a NAP under the pM mobility protocol. FIG. 13 shows the states 1205, 1210 and 1215 of FIG. 12 and, in addition, an optional neighbor range (NR) state 1320. The need for the NR state 1320 depends on which one of the mobility protocols is used.

Under coordination/cooperation protocols, the AT state 1210 and the IR state 1215 collapse into a single state, whereby any transitions between these states disappear. For each state other than the NA state 1205, the IWF entity within each NAP maintains a list of WTRUs in that state. When a WTRU is listed in a NA, AT, IR, or NR list, it is noted that the NAP is aware of the WTRU.

The state transition diagram depends on the mobility protocol utilized. Two types of WTRU mobility protocols, a push mobility protocol (pM) and a poll mobility protocol (qM) are described below. Both protocols require each NAP to maintain a list of neighbor NAPs, which are in the vicinity of the given NAP. The notion of vicinity may be tied to the physical distance, but may, in fact be left up to the system designer.

A blanket associated with a WTRU is the set of all NAPs for which the given WTRU is in the AT state, together with a unique virtual MAC address within the BWLAN.

The mobility protocol qM operates as follows. The NR state 1320 is not used, and as noted above for some coordination/cooperation techniques, the AT state 1210 and the IR state 1215 may be merged. Upon receiving a data burst from a WTRU that it is not aware of the WTRU, and which is not an association requested by the WTRU, the IWF entity uses the neighborhood NAC to poll the NAPs on its neighbor list. If at least one of the neighbor NACs is aware of the WTRU, then it responds to the NAP of interest with all relevant information about the WTRU (i.e., access control parameters, QoS parameters, active connections, security parameters, or the like). Whether or not the WTRU is added to the IR or AT list depends on the coordination/cooperation protocol.

If none of the neighbor NAPs respond with the WTRU information, the WTRU is flagged as new and is reported to the BWLAN. Transitioning between the AT state and IR state depends on data plane operation and may also be forced by the network. A NAP may drop a WTRU (i.e., transition it to the NA state), if instructed by the network (i.e., by some network entity, centralized distributed, or otherwise). Otherwise, each transmission from the WTRU or to the WTRU successfully received by the NAP resets a timer for that WTRU. The timer value may depend on the state, as well as whether the WTRU is in power-saving mode. If the timer expires, then the NAP sends a range probe to the WTRU to check if the WTRU is still within range of the NAP. If no response is received, then the WTRU is dropped.

FIG. 13 shows the state transition diagram for a WTRU within a NAP with the qM mobility protocol. This protocol has several advantages. It minimizes the amount of information exchanges over the backhaul, and information is only exchanged when needed and only between neighboring NAPs. It also provides for a natural way to change the set of NAPs which serve a WTRU. The NAPs begin to serve a WTRU when necessary (i.e., only when the WTRU may communicate with them), and stop doing so when no longer necessary.

The latency on the polling process may be rather low as a new WTRU may need to be added to the NAPs supported set rather quickly. To address this, a protocol which proactively makes sure that WTRU information is available at the NAPs likely to serve the WTRU but not currently aware of it is described.

Each NAP is configured to send an update report from neighbor (URN) message that informs its neighbor NAPs of the WTRUs that it is aware of. The IWF provides a list of such WTRUs to the neighborhood NAC that manages such updates. The URN message either carries all access information for each WTRU (i.e., access rights, crypto keys, etc.) or the NAP has a means of obtaining these from the network. The URN may be issued periodically and/or it may be triggered by a change in state in one of the WTRUs. The content of the URN may include the complete list or only relevant changes. A proper BWLAN design may likely require a mixture of both kinds of updates.

Figure 14:
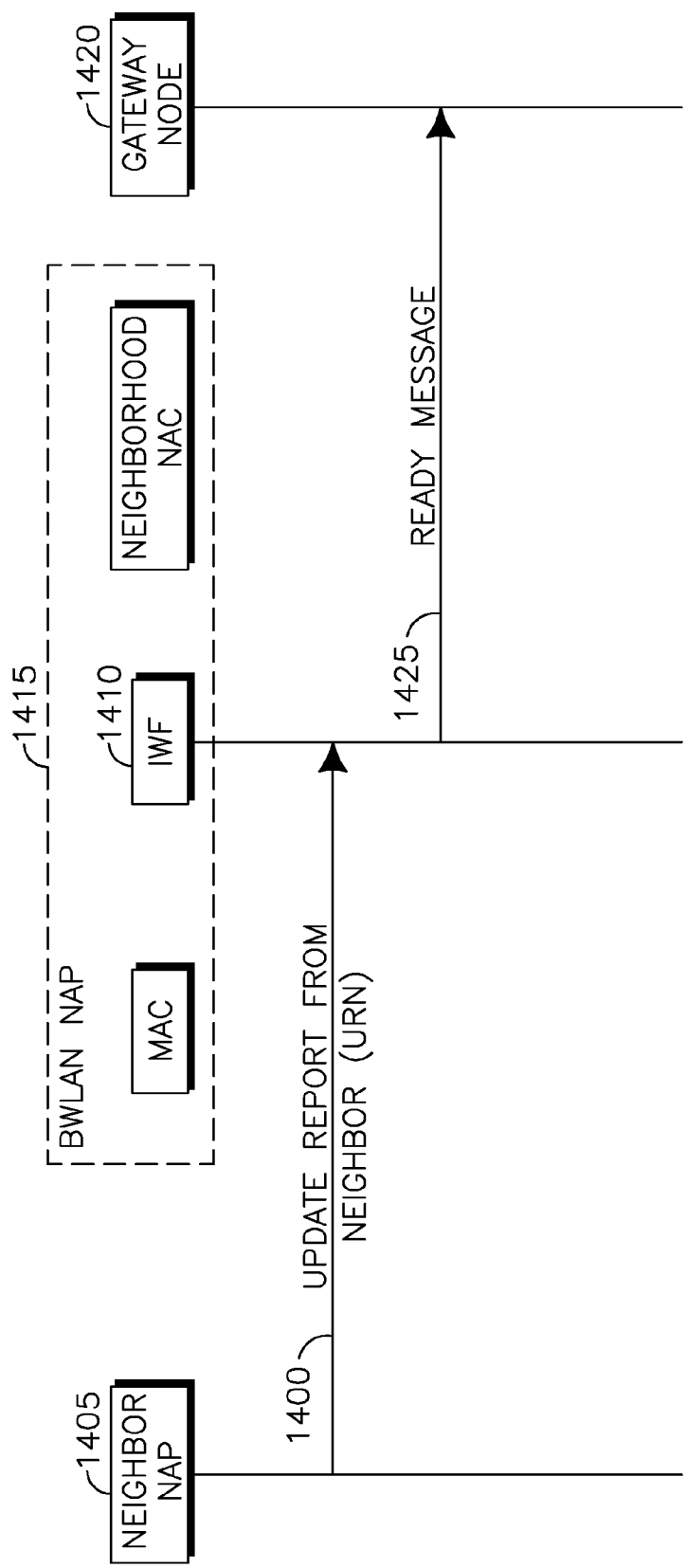
FIG. 14 is a signal flow diagram in a network including a neighbor NAP, a BWLAN NAP and a gateway node.

As shown in FIG. 14, upon receiving a URN 1400 from a neighbor NAP 1405, an IWF entity 1410 in a BWLAN NAP 1415 checks a list of WTRUs in the URN 1400 against the WTRUs it is aware of (i.e., those in the AT, IR or NR state). If it is already aware of the WTRU in the URN 1400, then the BWLAN NAP 1415 does nothing. If the URN 1400 contains a report of a WTRU that the BWLAN NAP 1415 is not aware of, then the BWLAN NAP 1415 adds the WTRU to its list of WTRUs and places it in the NR state. Upon first receiving a transmission from a WTRU that the BWLAN NAP 1415 has not previously communicated with, and which is not an association request from the WTRU, the IWF entity 1410 checks its NR list for this WTRU.

If the WTRU is in the NR list, then the IWF entity 1410 moves the WTRU into the IR state and sends a ready message 1425 to a gateway node 1420 that it is ready to communicate with the WTRU. Based on the response from the network, the WTRU may remain in the IR state or be moved into the AT state. The network response depends on the cooperation protocol. If the new WTRU is not on the NR list of the BWLAN NAP 1415, then a fault occurs. The BWLAN NAP 1415 may take several actions such as informing the network of a new WTRU. Alternatively, the BWLAN NAP 1415 may revert to the qM mobility protocol, and polls its neighbors first before reverting to contacting the network.

Transition between AT and IR states depends on data plane operation and may also be forced by the network. A NAP maintains a timer for each WTRU in the AT and IR state. If the timer expires, the WTRU is transitioned to the NR state from either the AT state or the IR state. A NAP may drop a WTRU (i.e., transition it to the NA state) if instructed by the network (i.e., by some network entity, centralized distributed, or otherwise). For each WTRU in the NR state, the NAP maintains a timer that is different from the timer for AT state and IR state. If this timer expires without a transmission to or from the WTRU, then the NAP sends a range probe to the WTRU to check if the WTRU is still within range of the NAP. If no response is received, then the WTRU is dropped (i.e., transitioned into the NA state).

NAPs covering a given WTRU monitor transmissions from the WTRU to ensure that if the WTRU remains within the coverage range of the NAP it is not dropped. Transmissions from the WTRU may be detected either by matching an address of the WTRU with the sending address in a received packet, or if a sending address is not available but a transmission may be reliably traced to the WTRU. For example, in the IEEE 802.11 MAC protocol, the header of an uplink data frame contains addresses for both the source and the destination of the frame.

If there are no uplink transmissions, but there are downlink transmissions, monitoring the received positive acknowledgements (ACKs) is not sufficient to reveal the identity of the sending WTRU. An ACK carries a destination address, which for a downlink transmission may be a blanket virtual MAC address. Successfully received downlink transmissions may be used to ascertain whether the WTRU is within range of a NAP. The NAP monitors transmission by other NAPs in the WTRU's blanket. If the destination address matches the WTRU's address, then the NAP waits for an acknowledgement. If an ACK is received within a short interframe space (SIFS) of the transmission, and the destination address matches the address of the NAP that transmitted the last detected frame to the WTRU, then the WTRU is maintained in the IR state.

A timer is set following the last detected transmission from/to the WTRU. If the timer expires without a transmission from or to the WTRU, then the NAP sends a range probe to the WTRU to check if the WTRU remains within range of the NAP. This probe may be any frame that requires a response. Examples of such a frame for IEEE 802.11 WTRUs may be a dummy data frame (i.e., no payload) that requires acknowledgement, or a request to send (RTS) with duration set to the duration of the response. If no response is received, then the WTRU is dropped (i.e., transitioned into the NA state).

If the WTRU is in a power save (PS) mode, then the NAP may indicate in its beacon that frames are buffered for the WTRU. If the WTRU does not respond with a PS poll or an automatic power save delivery (APSD) trigger frame within a specified time, then the WTRU is dropped. A timer keeps track of the waiting period; it is set to a sufficiently long value to accommodate the sleep cycle of a power-saving WTRU.

The use and reuse of the full available RF spectrum across the coverage area and range of mobility of the WTRUs is described. A single WTRU transmits and receives on the same channel while the blanket of NAPs that cover it changes. The WTRU behaves as if it is covered by the same NAP.

For a WTRU to be able to maintain a constant channel, the NAPs may be able to receive and transmit on the channel used by the WTRU. In order to accommodate new WTRUs moving within range of a NAP from different directions and using possibly different channels, the NAP may be able to communicate on different channels. This may be performed in several ways. One way may be for each NAP to be equipped with multiple radios.

Use of multiple channels may increase the traffic load that may be handled by the system, as fewer users may contend for the same channel. Because channel assignment is determined by the initial location of the WTRU upon association and its subsequent mobility, however, an ad-hoc channel re-use footprint may result, which may be less efficient than one resulting from a WTRU changing channels according to an RF planning procedure.

Efficient channel re-use may be achieved with a compromise between a WTRU using a constant channel, and a WTRU changing channels every time its closest NAP changes.

Partitioning the coverage area into regions, comparable to cells, but without a specific base station, may be considered. The partitioning may be based on traffic load. A region may contain multiple NAPs, with possibly overlapping coverage areas. Assigning channels to each region according to a fixed re-use plan or dynamic channel assignment algorithm. Depending on the RF spectrum allocation for the wireless system, there may not be sufficient channels to allow for interference free re-use. In that case, there may be collisions between users in different regions assigned the same channel, which may be resolved according to the protocol employed for medium access. If there are more channels available per region when following an interference-free re-use plan, then the NAPs may benefit from having multiple radios.

NAPs in a given region use as their primary channel, one of, the same channel assigned to the region. A WTRU associating with its first NAP may be using the NAP's channel. As the WTRU moves into a neighboring region the WTRU may change its channel. Handover between regions may be facilitated by the NAPs near the boundary between two neighboring regions using multiple radios. The extra radios may be tuned to the channels assigned to the neighboring region. The procedure reduces the delay that may be involved in changing channel as the nearest NAP changes. At the same time, it improves the re-use efficiency of the available RF resources.

The two protocols which enable efficient decentralized management of the blankets for each WTRU and may address the inherent latency and bandwidth limitations of the backhaul were described. Notwithstanding these approaches, a need for centralized coordination exists. Such coordination may be able to tolerate significant latencies, impose minimal overhead on the backhaul and minimal computational load on the gateway.

Various goals may be addressed by a centralized blanket management system. Inter-blanket interference management, that may reduce or eliminate cross-blanket interference as needed. NAP load balancing, which makes sure that NAPs supporting multiple blankets are not overloaded. Extra-ordinary functionality (e.g., a global broadcast/receive, global blanket) for support of emergency services.

All of the tasks may be accomplished by explicitly changing the state of a NAP to begin or stop supporting transmissions to/from a particular WTRU. The capability to effect such a direct change is captured in the state transition diagrams of FIGS. 12 and 13. The assignment may require a resource management algorithm.

The control plane operates according to whether a WTRU associates with a BWLAN, WTRU mobility (a NAP joins the blanket for pM and qM protocols), a NAP leaves the blanket for pM and qM protocols, and/or the WTRU disassociates.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method, performed by a given network access point (NAP) in a blanket wireless local area network (BWLAN), of providing mobility and cellularization functionality, the method comprising:
an inter-working function (IWF) entity in the given NAP maintaining lists of wireless transmit/receive units (WTRUs) in respective states;
the given NAP maintaining a list of neighbor NAPs;
the given NAP operating in accordance with a selected WTRU mobility protocol; and,
the given NAP receiving an update report from a neighbor (URN) message indicating particular WTRUs that a NAP transmitting the message is aware of.

2. The method of claim 1 wherein the states include a "not aware" (NA) state in which the given NAP is actually not aware of a particular WTRU.

3. The method of claim 1 wherein the states include an "active transmit" (AT) state in which the given NAP is actively transmitting to a particular WTRU.

4. The method of claim 1 wherein the states include a "neighbor range" (NR) state for WTRU s indicated in the URN message that the given NAP was not aware of.

5. The method of claim 1 wherein the WTRU mobility protocol is a push mobility protocol.

6. The method of claim 5 further comprising:
each particular NAP informing its neighbor NAPs of the WTRUs which the particular NAP is aware of;
each particular NAP transmitting an update report from the neighbor (URN) message; and
each NAP that receives a URN comparing a list of WTRUs in the URN message against the WTRUs the NAP is aware of.

7. A method, performed by a given network access point (NAP) in a blanket wireless local area network (BWLAN), of providing mobility and cellurization functionality, the method comprising:
an inter-working function (IWF) entity in the given NAP maintaining lists of wireless transmit/receive units (WTRUs) in respective states;
the given NAP maintaining a list of neighbor NAPs;
the given NAP operating in accordance with a selected WTRU mobility protocol; and,
the WTRU mobility protocol is a poll mobility protocol that enables the IWF entity to use a neighborhood network access control (NAC) entity in the given NAP to poll the NAPs on its neighbor list in response to receiving at least one data burst from a WTRU.

8. The method of claim 7 wherein a medium access control (MAC) entity in the given NAP extracts source and destination MAC addresses from the at least one data burst, and forwards the MAC addresses to the IWF entity.

9. The method of claim 8 further comprising:
the IFW entity providing the MAC entity with a list of active source and destination MAC addresses for both transmission and reception.

10. The method of claim 8 wherein the MAC entity processes data bursts for transmission on a condition that the source and destination MAC addresses are in an active transmission list.

11. The method of claim 8 wherein the MAC entity forwards a payload of the received data burst to the IFW entity on a condition that the source and destination MAC addresses are in an active reception list.

12. A blanket wireless local area network (BWLAN) network access point (NAP) for providing mobility and cellularization functionality, the BWLAN NAP comprising:
an inter-working function (IWF) entity configured to maintain lists of wireless transmit/receive units (WTRUs) in respective states;
a neighborhood access control (NAC) entity configured to maintain a list of neighbor NAPs;
a medium access control (MAC) entity configured to extract source and destination MAC addresses from at least one received data burst, and forward the MAC addresses to the IWF entity, wherein the BWLAN NAP operates in accordance with a selected WTRU mobility protocol; and, the IWF entity is configured to receive an update report from neighbor (URN) message indicating particular WTRUs that a NAP transmitting the message is aware of.

13. The BWLAN NAP of claim 12 wherein the states include a "not aware" (NA) state in which the BWLAN NAP is actually not aware of a particular WTRU.

14. The BWLAN NAP of claim 12 where in the states include an "active transmit" (AT) state in which the given NAP is actively transmitting to a particular WTRU.

15. The BWLAN NAP of claim 12 wherein the states include a "neighbor range" (NR) state for WTRUs indicated in the URN message that the BWLAN NAP was not aware of.

16. The BWLAN NAP of claim 12 wherein the WTRU mobility protocol is a push mobility protocol that enables the IFW entity to provide a list of WTRUs to the neighborhood NAC entity.

17. A blanket wireless local area network (BWLAN) network access point (NAP) for providing mobility and cellularization functionality, the BWLAN NAP comprising:

an inter-working function (IWF) entity configured to maintain lists of wireless transmit/receive units (WTRUs) in respective states;
a neighborhood access control (NAC) entity configured to maintain a list of neighbor NAPs;
a medium access control (MAC) entity configured to extract source and destination MAC addresses from at least one received data burst, and forward the MAC addresses to the IWF entity, wherein the BWLAN NAP operates in accordance with a selected WTRU mobility protocol; and,
the WTRU mobility protocol is a poll mobility protocol that enables the IWF entity to use the neighborhood NAC entity to poll the NAPs on its neighbor list in response to receiving at least one data burst from a WTRU.

18. The BWLAN NAP of claim 17 wherein the IFW entity provides the MAC entity with a list of active source and destination MAC addresses for both transmission and reception.

\* \* \* \* \*